United States Patent
Phillips

(10) Patent No.: US 6,400,712 B1
(45) Date of Patent: Jun. 4, 2002

(54) FAST CIRCUIT SWITCHED DATA ARCHITECTURE AND METHOD

(75) Inventor: Marc S. Phillips, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/085,323

(22) Filed: May 26, 1998

(51) Int. Cl.[7] .............................................. H04L 12/66
(52) U.S. Cl. ...................................... 370/355; 370/398
(58) Field of Search ................................ 370/355, 398, 370/335

(56) References Cited

U.S. PATENT DOCUMENTS

| | | | | |
|---|---|---|---|---|
| 5,305,308 A | * | 4/1994 | English et al. | 370/355 |
| 5,434,854 A | * | 7/1995 | Focarile et al. | 370/335 |
| 5,483,524 A | * | 1/1996 | Lev et al. | 370/355 |
| 5,654,957 A | * | 8/1997 | Koyama | 370/355 |
| 5,729,536 A | * | 3/1998 | Doshi et al. | 370/398 |
| 5,729,544 A | | 3/1998 | Lev et al. | 370/352 |
| 5,828,651 A | * | 10/1998 | Jang et al. | 370/355 |

FOREIGN PATENT DOCUMENTS

| | | |
|---|---|---|
| GB | 2283154 | 4/1995 |
| WO | 9507595 | 3/1995 |

OTHER PUBLICATIONS

Budka, et al. "Cellular Digital Packet Data Networks" Bell Labs Technical Journal 2(3): 164–181 (Summer 1997).
Melanchuk, et al. "CDPD and Emerging Digital Cellular Systems" IEEE (Conf. 41): 2–8 (1996).
Sushko, Michael S. "Advanced Data Services for Wireless Communication Networks" IEEE (Conf. 45): 331–335 (1995).

* cited by examiner

Primary Examiner—Salvatore Cangialosi
(74) Attorney, Agent, or Firm—Kent D. Baker; Brian S. Edmonston

(57) ABSTRACT

An efficient method and architecture for transferring packetized digital data over a circuit switched data network. On packet data calls, the receiving entity initially identifies the packetized data call as being of the circuit switched variety, thereby permitting further processing of the call using circuit switched infrastructure. Based on identification information embedded in the received data packets, the receiving entity subsequently identifies the call as being a packet data format, and routes the payload packet data to the upper layers of the protocol stack of the receiving entity. The network layer then routes the packet data directly to the connected data network (such as the internet), bypassing normal circuit switched call processing. Accordingly, infrastructure not equipped to handle packet data can be made to do so in an efficient and reliable manner, using only existing cellular service options and a unified interworking function (IWF) module. Mobile unit dormancy is supported on mobile-terminated packet data calls through the use of a second existing cellular service option for paging and call identification.

47 Claims, 10 Drawing Sheets

FAST CIRCUIT SWITCHED DATA ARCHITECTURE AND METHOD

BACKGROUND OF THE INVENTION

I. Field of the Invention

The present invention relates to communication systems. More particularly, the present invention relates to the transmission of packetized data over circuit switched frame based data communication systems.

II. Description of the Related Art

Data Networks

Networks for interconnecting information processing entities are presently in widespread use. In general, networks provide for the communication of digital data between two or more data terminals or processing devices. Internetworks are essentially groups of individual networks coupled together so as to allow data interchange therebetween. The largest and most commonly known digital data network is the Internet.

Typical networks operate based on the transfer of discrete, quantized units of data called packets or frames. Thus, an entire file of data, such as an e-mail message, is segmented into a series of frames for transmission over the network. The actual data in each frame is attached to a series of headers associated with a set of protocol layers, described in additional detail below. Each protocol layer is devoted to handling one or more tasks involved with the transportation of data between terminals.

Most digital networks are comprised of many nodes or branch points. On its journey through the network, a frame may pass through a series of network nodes. The nodes may be generally categorized as repeaters, bridges, routers, switches or gateways based largely on 1) the highest protocol layer which is examined by the node, and 2) whether the node transforms the data between transport protocols. The nodes may be connected using a variety of different physical media referred to as links.

Network Protocols

An industry standard model describing seven protocol layers ranging from the physical layer to the application layer is defined by the Open Systems Interconnection (OSI) model. The layers are related hierarchically by level of abstraction with the physical layer being the lowest and the application layer being the highest. For instance, RS-232 is a physical layer protocol defining the electrical signal interface between terminals, whereas Simple Mail Transfer Protocol (SMTP) is a commonly used application layer protocol for sending e-mail over a network. A similar model, Transport Control Protocol/Internet Protocol (TCP/IP), is presently in widespread commercial and military use in data networking applications. The TCP/IP protocol suite (also known as a "stack", due to the aforementioned layered construction) uses application, transport, internetwork, and network access layers. Overall, the TCP/IP suite provides a number of functions, including remote file transfer and copy, remote login capability, gateway and router support, electronic mail (STMP), and serial line communications via other existing protocols such as PPP or SLIP (described further below).

Generally speaking, Internetwork Protocol (IP) is implemented in all end systems and routers; it acts to relay or move a block of data on an internetwork from one host to another via one or more routers. Hence, it facilitates the delivery of data message packets (typically called "datagrams"; see discussion of packet switching below) from two devices not directly connected. TCP is typically resident only in end systems; it essentially functions to track and deliver data to the appropriate application layer entity. Specifically, TCP avoids loss, damage, duplication, or misordering of datagrams that may result from the application of IP by way of checksums, sequence numbers in the TCP header, and other means. Additionally, security and access limitations may be applied via TCP. In the generic TCP/IP suite, the network layer uses existing network protocols (such as Ethernet, IEEE Standard 802, or X.25), and encompasses those protocols necessary to effectuate physical communication with other network nodes or entities. FIG. 1 illustrates the basic OSI and TCP/IP protocol suite models. IETF RFC 793 and 791 provide additional information on TCP and IP protocols, respectively.

Two levels of addressing are typically used in protocol suites such as TCP/IP. The first specifies the global internetwork (IP) address of a given host on a network, typically a 32-bit word. The second is unique within the host; i.e., it allows the host-to-host protocol (such as TCP) to deliver data to the proper application within a given host entity. This second address is commonly known as a port. Systems running TCP/IP typically have what is known as a kemal or internet routing table consisting of a series of entries, each entry containing multiple data fields. These fields include the destination IP address, a network mask, network "hopping" address (i.e., the next machine which knows how to reach the ultimate destination of the data message), and the identity of the network interface device through which the datagram(s) must be sent to reach the next hop. Routing "daemons" initialize and dynamically update the kernal routing table by communicating with comparable entities in other systems to exchange routing information.

The Point-to-Point Protocol (PPP) is a link protocol which provides for the use of network applications within the TCP/IP suite over serial line interfaces (such as dial-up Internet connections) by linking the serial line(s) to the IP protocol driver. The PPP stack typically consists of multiple components, including an asynchronous high level data link control (HDLC) protocol, a link control protocol (LCP), an network control protocol (NCP), and authorization protocols. The HDLC layer is typically the lowest layer of the stack, and functions to provide framing for data packets, error detection, and frame identification for high level protocols. The LCP sits above the HDLC and dynamically determines transmission link characteristics (MRU and ACCM) and integrity. The NCP (for example, Internet Protocol Control Protocol {IPCP} for IP suites) carries out addressing functions relating to the PPP link. Note that multiple NCPs can run on the same PPP link. RFC 1661 and 1332 provide additional information on PPP and IPCP protocols, respectively.

The PPP operates generally as follows. In order to establish a point-to-point link, each end of the PPP link must first send LCP packets to configure and test the data link. After the link has been established and transmission features negotiated, PPP sends NCP packets to select and configure the operable NCPs. Once each of the chosen NCPs is configured, datagrams from each NCP can be sent over the link.

Wireless Link to a Data Network

With the advent of wireless communication techniques, data networks now provide the terminal user with greatly increased mobility. For example, a lap top computer may utilize a cellular telephone transceiver to connect to digital networks such as the internet without a wired connection to a physical data port. Numerous other data network applications over wireless links are possible, as described below.

FIG. 2 is a representation of a terrestrial wireless communication system 10. The system illustrated in FIG. 2 may use code division multiple access (CDMA), time division multiple access (TDMA), a combination of frequency hopping and TDMA (such as the Global System for Mobile Communications, or GSM) or other modulation and access techniques. FIG. 2 shows two remote units 10, 12, and two base station antenna 14. In reality wireless communication systems may have hundreds of thousands of remote units and many hundreds of base stations. In FIG. 2, the remote unit 10 is shown as a mobile telephone unit with a laptop computer 11 connected thereto. FIG. 2 also shows the personal digital assistant 12 in a standard cellular system. In the most general embodiment, the remote units may be any type of communication unit. For example, the remote units may be hand-held personal communication system (PCS) units, portable data units, or fixed location data units such as meter reading equipment. FIG. 2 shows a single wireless link 16 between the base stations 14 and the remote units 10 and 12, although it can be understood that such link may comprise a separate forward and reverse link. Base station transceiver/controller (BST/BSC) equipment 18 is provided to support each base station and interface with the mobile switching center (MSC) complex 20. The MSC complex 20 may contain one or more interworking functions (IWFs) as described in greater detail below. Ultimately, the cellular mobile units 10, 11 and 12 interface with land-based users 22 via a standard public switched telephone network (PSTN) switching device 24.

The following discussion assumes operation in accordance with the system described in TIA/EIA Interim Standard 95-B published by the Telephone Industry Association entitled "Mobile Station-Base Station Compatibility Standard for Dual-Mode Wideband Spread Spectrum Cellular System," commonly referred to as IS-95. It can be appreciated, however, that the generic principles of the present invention can be directly applied to other wireless standards and types of data systems—even those which may not be associated with a wireless link.

A remote unit which is used for voice communication transmits and receives frames of voice data over established traffic channels within a wireless link. As voice frames are transferred over a wireless link, it is not required that each frame passes without error over the link. Telephone quality voice is produced even with uncorrected frame error rates as high as 3 errors in 100 frames transferred. When confronted with an erroneously received frame, the physical layer simply discards the frame and replaces the frame with a frame erasure in order to maintain synchronization. Therefore, the physical link protocol as defined in IS-95 does not provide for the error-free transfer of frames.

In contrast to voice data, digital information data must typically be error-free in order to be useful. For CDMA data services, a new radio link protocol (RLP) layer is added to the protocol stack in order to substantially reduce the error rate exhibited by CDMA traffic channels. The RLP provides frames to and accepts frames (and frame erasures) from the physical link protocol. One primary function of the RLP is to provide error detection and correction.

A family of data transmission standards compatible with IS-95 has been adopted by the Cellular Telephone Industry Association. An early standard is described in TIA/EIA Interim Standard 99 (IS-99) and entitled "Data Services Option Standard for Wideband Spread Spectrum Digital Cellular System." Another more recent standard is described in IS-707 entitled "Data Service Options for Wideband Spread Spectrum Systems." IS-99 and IS-707 define, among other things, an RLP which provides the functionality just described.

IS-99 also defines the technical requirements for cellular Service Options "4" and "5" (SO4 and SO5) for asynchronous data service and digital facsimile service, respectively. In general, the term "service option" can be defined as a set of requirements which define the way in which traffic channel frames (forward and reverse link frames in the IS-95 context) are processed by the mobile units and cellular infrastructure. Specific service options are available to each individual mobile user based on the types of services requested by that user, the configuration of his mobile unit, and the capabilities of the local infrastructure. Numerous circuit switched service options, such as SO12, exist in addition to SO4 and SO5 referred to above; however, it will be appreciated that such other options are largely interchangeable with SO4 and SO5 for the purposes of this discussion.

FIG. 3 depicts the generic IS-99 $U_m$ (air interface) protocol stack, hereinafter referred to as the IS-99 stack. As shown in the Figure, this stack is conceptually comprised of several components including, inter alia, the circuit switched IWF stack 21, the circuit switched BSC/MSC stack 23, and the circuit switched mobile stack 25. The IS-99 stack describes the minimum TCP, IP, and PPP protocols for the base station and mobile unit. Note the various functional layers as previously described, including the physical layer (IS-95A), the RLP layer, the PPP (data link) layer, the TCP (transport) layer, and the IP (network) layer. Also depicted is the subnetwork dependent convergence function (SNDCF) sublayer, which performs compression/decompression on the headers of datagrams passed from/to the transport and network layers.

Circuit Switching Versus Packet Switching

Two approaches to call data switching and routing are commonly employed within modern communication systems: circuit switching and packet switching. A circuit switched network can be generally defined as one in which a dedicated communication channel is maintained for the entire duration of message or data transmission. Data from multiple sources can be transmitted over physical transmission links using well known techniques such as time-division multiplexing; however, the allocation of the link to a given user (or set of users) is fixed for the duration of the call, and only one destination address can be specified for each user. Circuit switched systems are considered inefficient from the standpoint that data is often transmitted over the dedicated circuit only a fraction of the time, thereby having large segments of unused channel capacity (even when multiplexed). Common circuit switched data applications in the wireless context include modem and facsimile transmissions. It should be noted that the concept of circuit switching is not discordant with the concept of data framing as previously discussed; that is, framed data may be (and routinely is) sent over a circuit switched network.

In contrast to circuit switching, packet switching techniques make use of the packetized nature of the transmitted data (datagrams) to allocate resources within the switching network, and create the potential for distributing the packetized data from a single source to multiple users. Typically, datagrams are sent from an originating or source device to the destination device via one or more dynamically allocated physical channels while being interleaved or multiplexed with datagrams from other sources and/or destinations (see prior discussion of network protocols). Such dynamic allocation is often statistical in nature rather than of a fixed relationship as in circuit switched networks. Typically each datagram contains addressing and sequence information, making it a largely autonomous unit of data. Accordingly, individual packets of the same message may be routed differently to the same destination. Ultimately, the individual packets are reassembled, resequenced (if required) and formatted by the destination switching center for delivery to the destination address. In the wireless context, TIA/EIA Interim Standards 657 "Packet Data Service Options for Wideband Spread Spectrum Systems" and 707 "Data Service Options for Wideband Spread Spectrum Systems: Packet Data Services" govern the application of packet data services to CDMA systems. Referring to the protocol stack paradigm previously discussed, an IS-657/707 data packet could consist of the TCP/IP transport and internetwork data, the PPP (or other link layer protocol) data, and the RLP data, although other constructs are possible. As the packet is processed by successively higher layers of a given protocol stack, the header information and data associated with that layer are stripped off to provide critical packet handling and formatting instructions for the payload data.

One significant result of using a packetized data architecture such as that described above is that only intermittent use of air interface system resources is required in transmitting/receiving the packet data message(s), thereby potentially allowing simultaneous voice and data transmission/reception from the same mobile unit. Furthermore, the packetized data may be transmitted between the various CDMA cell cites and the mobile switching center (MSC) using the same backhaul as voice data, thereby not requiring additional packet data handling infrastructure. Other advantages offered through the implementation of packetized data protocols are manifold. For example, wireless mobile telephones can be connected to the internet without the need for extra modem hardware. Existing worldwide web browser applications, such as the UP.LINK™ product offered by Unwired Planet Inc., can connect to the internet (and ultimately the associated server) via the air interface to transmit a variety of different types of useful information to and from the mobile unit. Other devices such as personal computers (PCs) and personal digital assistants (PDAs) may also be connected to the internet via the mobile unit.

Despite the foregoing advantages, many cellular infrastructure manufacturers and service providers currently do not support CDMA packet data services in accordance with IS-657/707, and may not do so for a significant period of time. On the contrary, however, a plethora of existing and planned mobile end-user products and systems (such as the aforementioned Unwired Planet UP.LINK browser), utilize packetized data protocols. Existing digital wireless infrastructure, presently in widespread use throughout the world, lacks the intelligence necessary to recognize these packet data protocols without significant hardware and software modification. FIG. 4 shows a typical IS-95 base station/packet interworking function (IWF) architecture designed to support both IS-657/707 packet and circuit switched services. In the present context, the IWF is a communications interface device which allows interworking between outside switching and networking devices (such as PSTN entities) and the BSC/MSC. One embodiment of a circuit switched IWF is a pool of modems, although other types of data interfaces such as Ethernet or ISDN are frequently included within the IWF. The architecture depicted in FIG. 4 utilizes one or more IWF packet modules (IWF-P) 30 separate from those used for handling the circuit switched data (IWF-CS) 32. The IWF-P 30 routes packet data to a public switched data network (PSDN) 36 or equivalent, while the IWF-CS 32 routes circuit switched data (such as asynchronous data or digital facsimile calls) to a PSTN 24 or equivalent. Without an IWF-P module (and other related software and components), existing base station/MSC complexes 34 are incapable of differentiating a packet data call from a circuit switched call on existing cellular service options.

The most promising prior art method conceived to date to allow existing cellular infrastructure to recognize and process a packet data call without a separate IWF-P or service option involves the use of a separate IP/PPP protocol layer in conjunction with an IS-99 layer, as illustrated in FIG. 5. In this method, both the mobile unit 10, 12 and the IWP 32 utilize a separate IS-99 layer 40 through which all calls are processed over an existing circuit switched service option such as SO4. By inserting a special "AT" command (such as ATDT#xxx, for example) in the transmitted IS-99 layer data of the packet call datagram, the system could be cued to route subsequent message payload data to the next higher protocol layer (PPP, in this instance) 42 as opposed to routing them to a modem as would occur for a normal circuit switched call. Data directed to this PPP layer 42 would then be routed to the internet and the ultimate destination address via the higher layer protocols such as TCP/IP 44 previously described. However, this method has several significant drawbacks, including 1) significant processor and memory capability is required to process the IS-99 and IP/PPP stacks within the mobile unit and IWF during a packet data call, which may already be operating at or near capacity; 2) additional protocol layers require additional synchronization time, thereby increasing call setup and connection time; 3) additional protocol layers require significant additional engineering of the software code in the stack(s); and 4) the presence of additional protocol layers in both the mobile unit and IWF necessitate the transmission of additional data bytes over the air interface, thereby reducing overall system capacity and increasing latency.

Hence, an improved architecture and data handling method is needed to allow conventional cellular infrastructure and mobile units to interface with packetized data servers and end-user products, especially in light of the ever-increasing commercial demand and widespread implementation of these products. Such architecture and method would ideally require only negligible modification to the existing infrastructure and mobile unit hardware and software, thereby permitting cellular service and equipment providers to upgrade to packet data handling capability in a rapid and cost-effective manner, and without impact on existing customer support, system data handling capacity, or performance. Furthermore, the implementation of such packet data capability through existing cellular service options would be highly desirable from, among others, a consumer cost perspective.

SUMMARY OF THE INVENTION

According to the present invention, an improved architecture and method for transmitting packetized digital data over a circuit switched digital communications system is provided.

In one embodiment of the invention, a method of data communication is described which allows packetized data to be transmitted over digital cellular communications infrastructure which normally only supports circuit switched applications through the proper construction of the call data and protocol stacks. Specifically, on packet data calls, the receiving entity (base station/IWF in the present example, although as further described herein, mobile devices may also employ the method of the present invention to receive and process packet data) initially treats the packetized data call as being of the circuit switched variety, thereby permitting further processing. However, based on identification information embedded in the received data packets, the IWF is able to discern that the call is in packet data format, and payload packet data is subsequently routed directly to and processed by only those portions of the protocol stack relevant to packet data transfer. In this fashion, the circuit switched only terminals may be used to rapidly process such "pseudo-packet" or Fast Circuit Switched (FCS) data calls as if they were conventional circuit switched calls without the need for a separate cellular service option for packet calls. This method provides the further benefit of allowing a cellular service provider to support a greater total number of voice and data calls, since less airtime and processing is required to transmit and process the packet data as opposed to other prior art methods. As will be further described herein, both mobile originated and mobile terminated packet data calls may be processed using the technique of the present invention.

In another embodiment of the invention, an improved cellular infrastructure and protocol stack architecture is disclosed which allows for handling and routing of packetized data over circuit switched systems in accordance with the above-described method. A single IWF module is used to handle both circuit switched and packet data calls, thereby reducing the hardware and software necessary to support packetized data capability. In one embodiment of the protocol stack, identification of the call as being packetized is performed at the IP layer without the need for processing by a separate IS-99 layer or additional PPP layer. Such reduction of the hardware and software necessary to process a pseudo-packet or FCS call has many benefits, including less synchronization and training time between the synchronous layers in the protocol stack (such as PPP layers and TCP), as well as reduced mobile unit and base station signal processing and memory capacity necessary to process a given call.

In still another embodiment of the invention, the dormancy feature of the mobile unit is supported on mobile-terminated packet data calls through the use of a second cellular service option. Specifically, upon identification of a given call as a packet data call, the BSC/MSC is instructed by the IWF to page the dormant mobile unit using a second existing service option (such as SO5 for digital facsimile data, or other comparable option) for packet data calls only, thereby bypassing any ambiguity associated with paging of the dormant mobile on SO4 used for normal asynchronous data calls (or similar).

BRIEF DESCRIPTION OF THE DRAWINGS

The features, objectives, and advantages of the present invention will become more apparent from the detailed description set forth below when taken in conjunction with the drawings, wherein.

DETAILED DESCRIPTION OF THE PREFERRED EMBODIMENTS

Reference is now made to the drawings wherein like numerals refer to like parts throughout.

Figure 1:
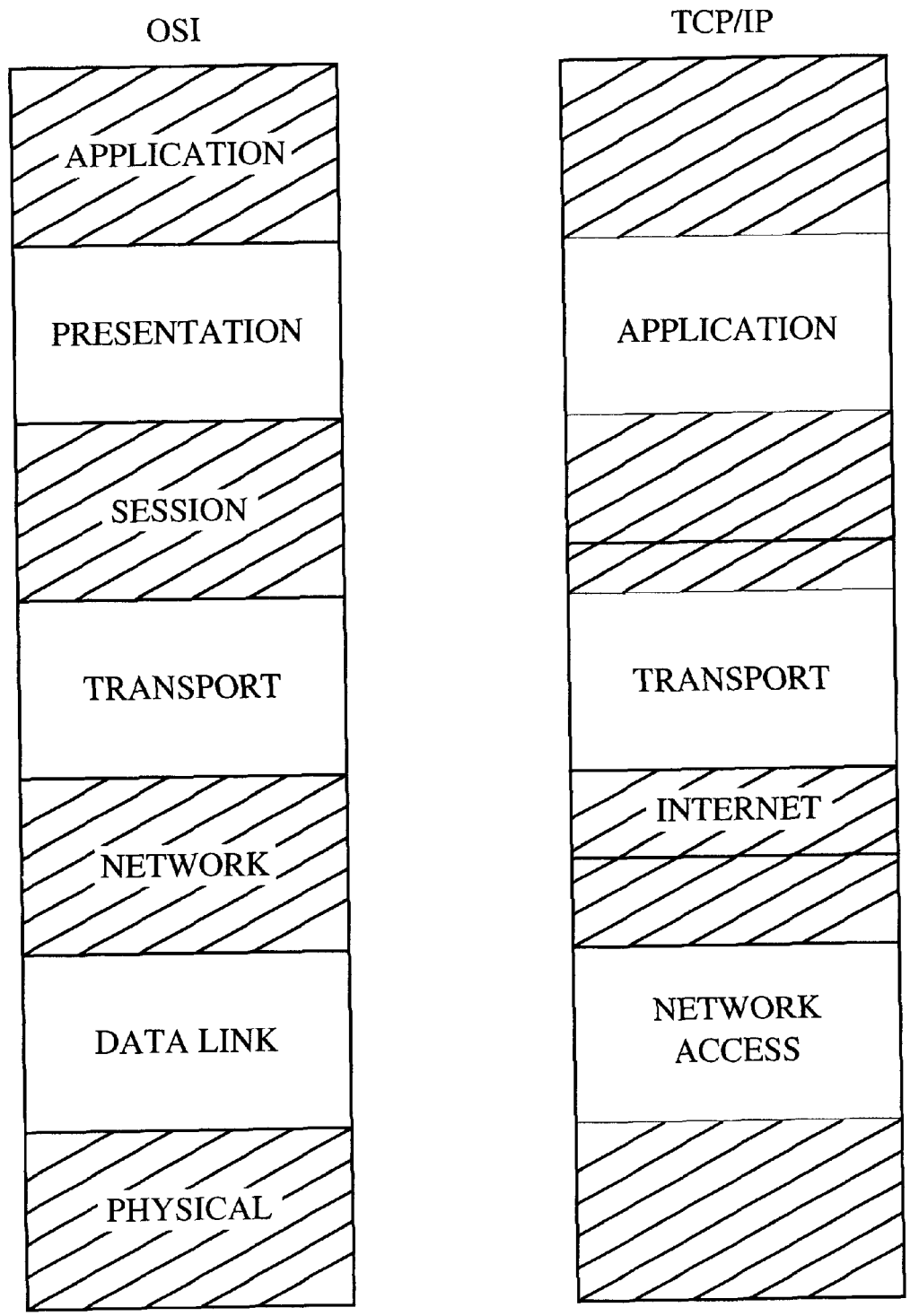
FIG. 1 is a block diagram showing the general architecture of the prior art OSI and TCP/IP Protocol suites.
Figure 2:
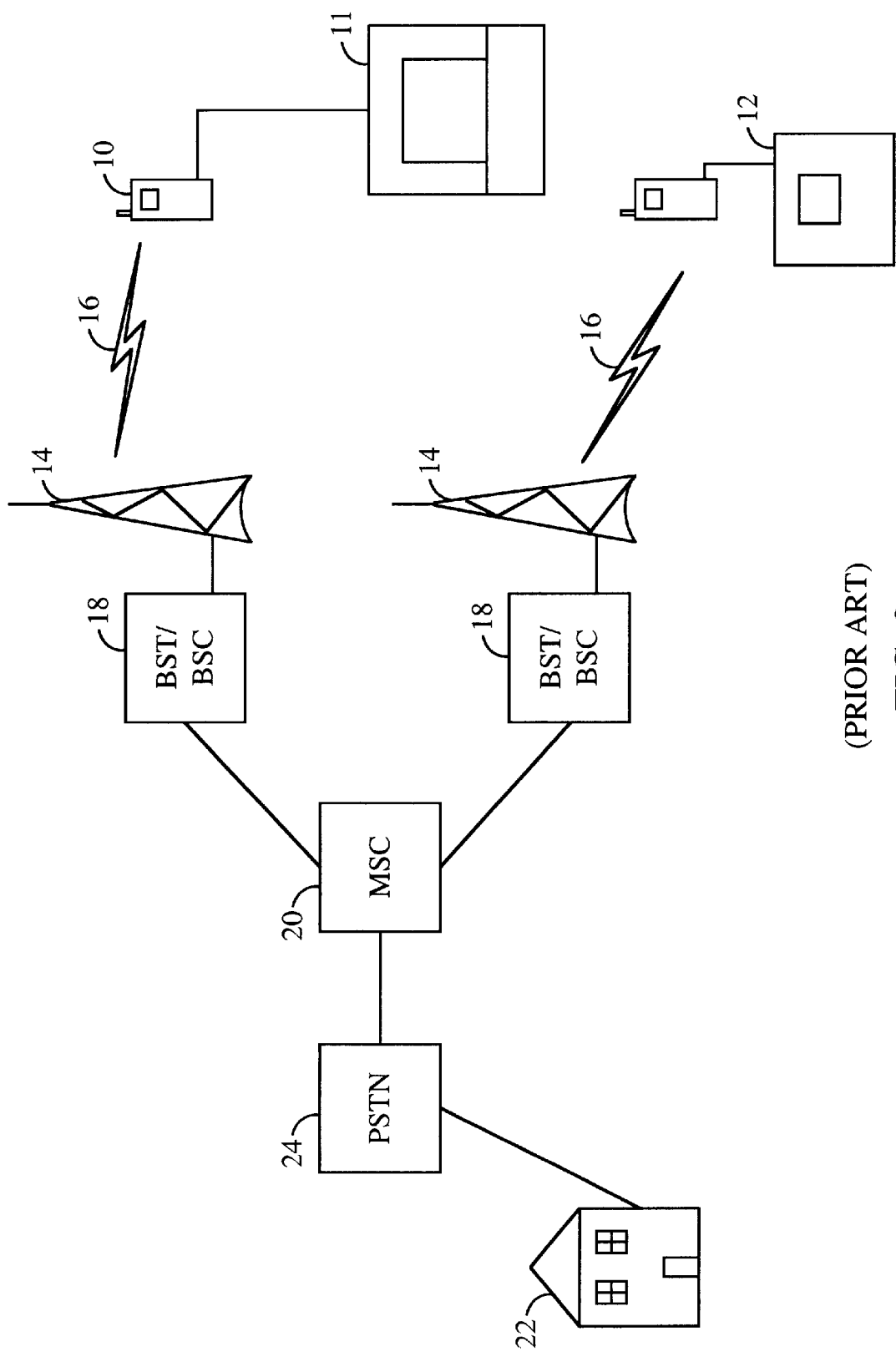
FIG. 2 is a block diagram of a typical wireless communication system.
Figure 3:
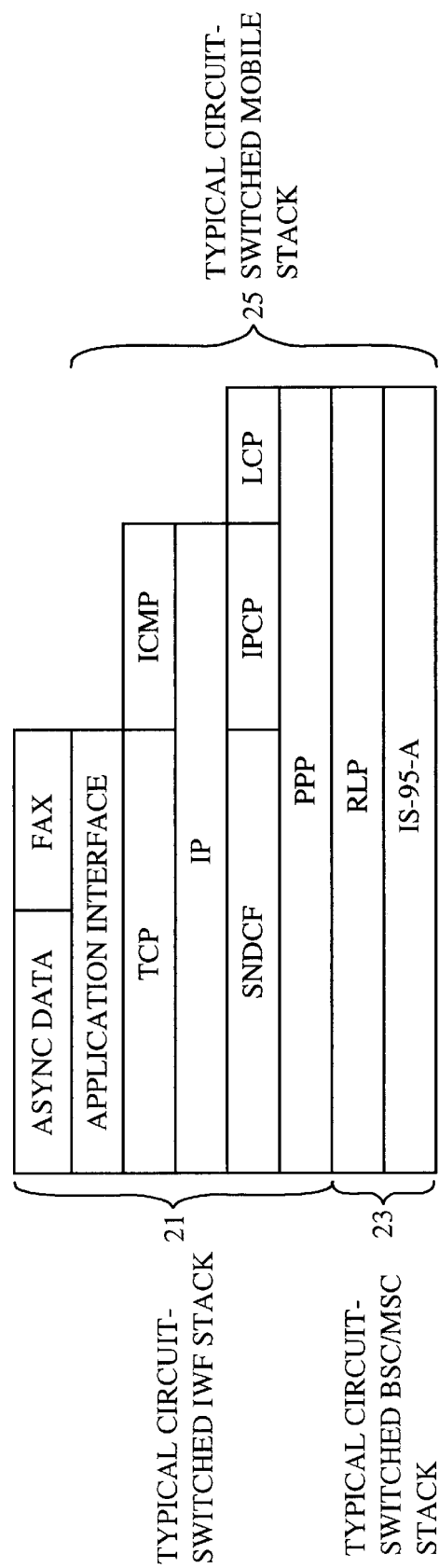
FIG. 3 is a block diagram of a generic $U_m$ (air interface) protocol stack as defined by IS-99.
Figure 4:
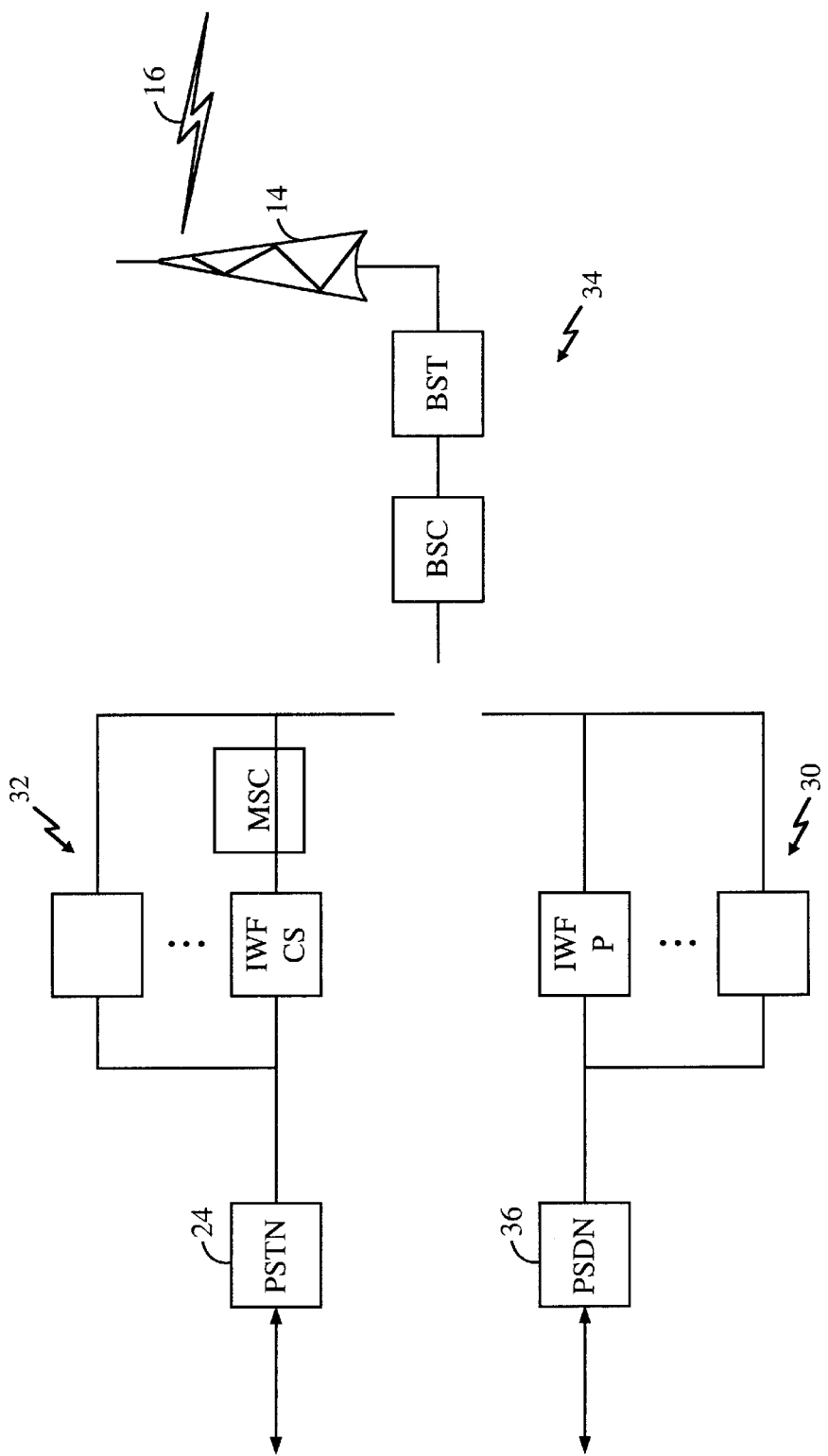
FIG. 4 is a block diagram showing an exemplary prior art base station controller and interworking function (IWF) arrangement for handling circuit switched and packet data calls.
Figure 5:
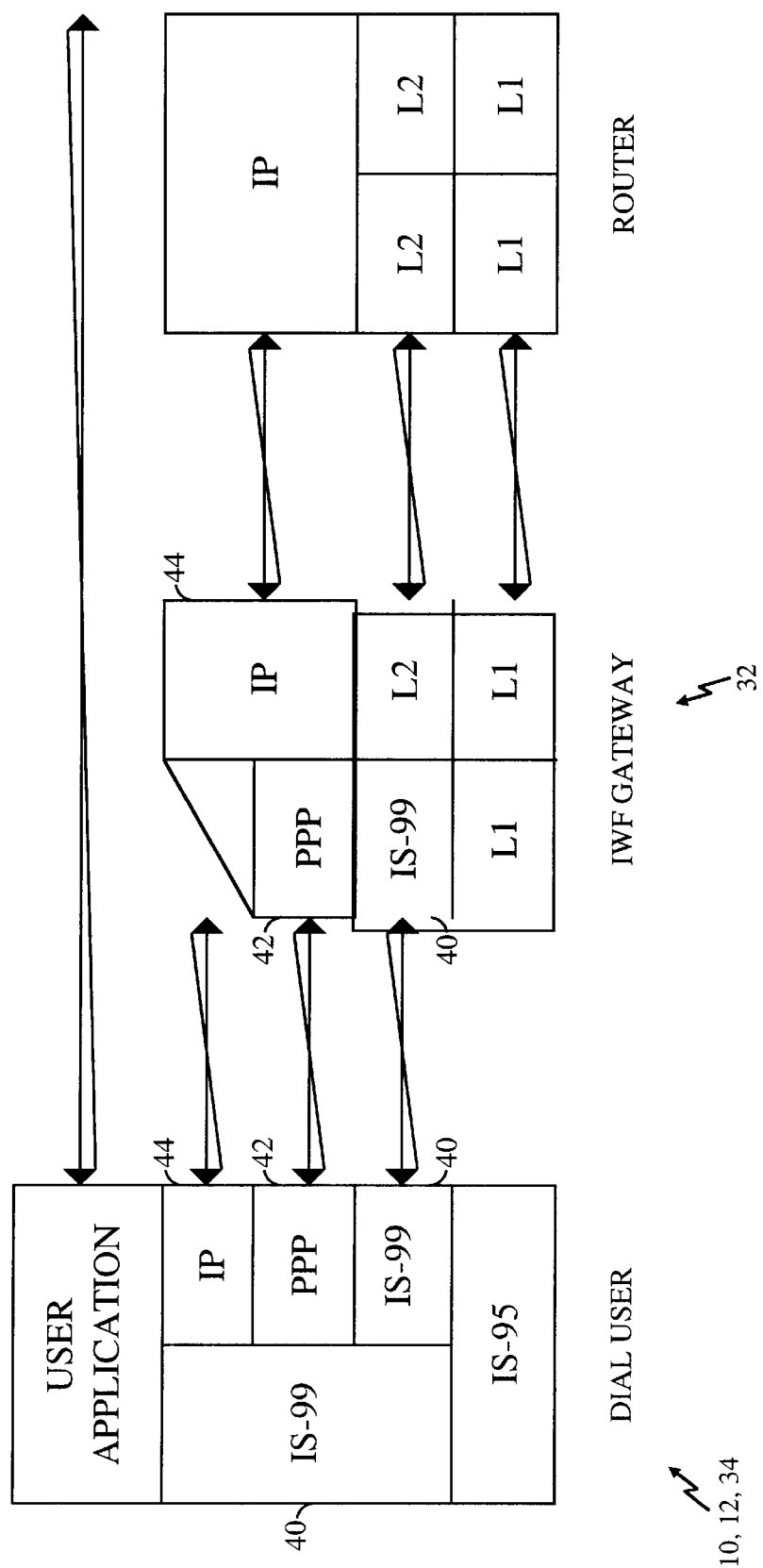
FIG. 5 is a block diagram showing a prior art protocol stack and method of permitting packet data calls to be transmitted over circuit switched infrastructure.
Figure 6:
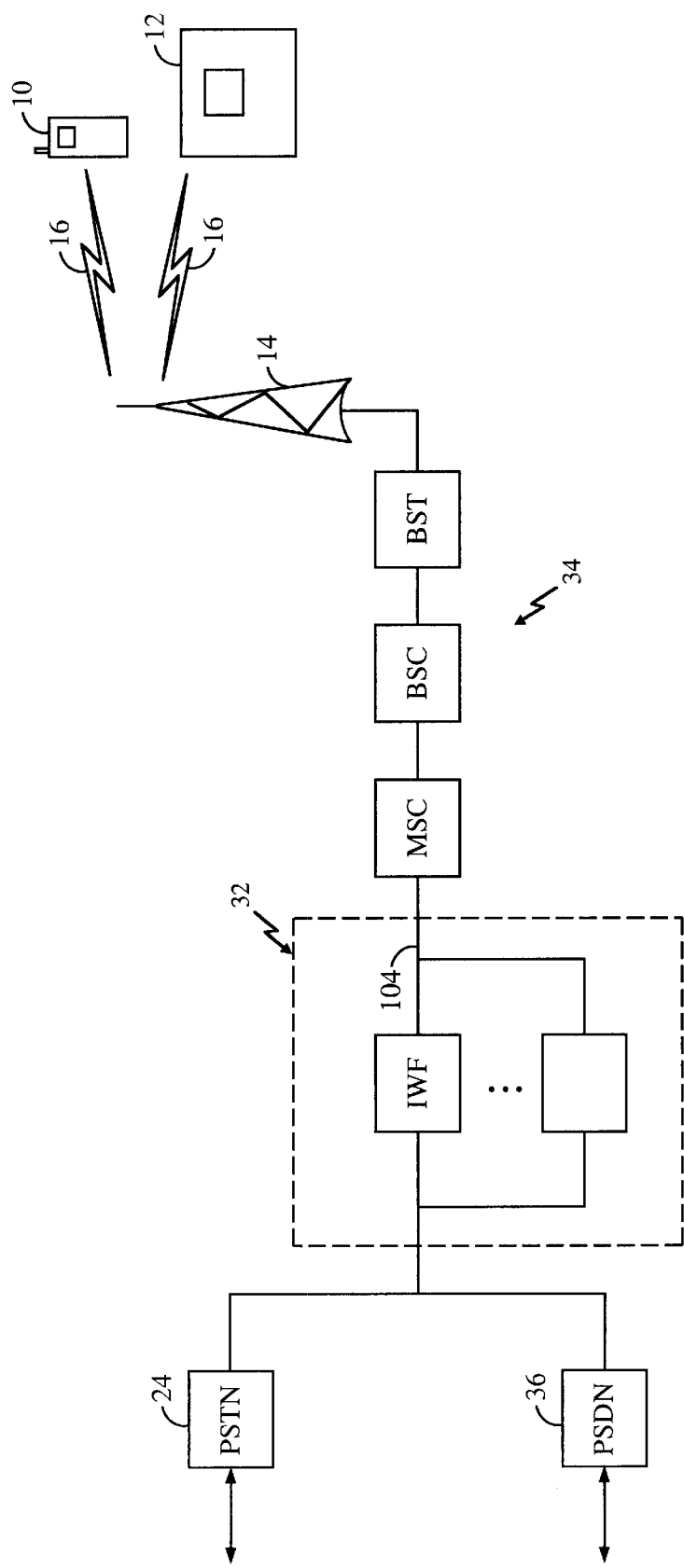
FIG. 6 is a functional block diagram showing an exemplary embodiment of the fast circuit switched (FCS) packet data hardware architecture of the present invention.

Referring now to FIG. 6, one embodiment of the BSC/IWF hardware architecture of the present invention involves the use of a unified IWF-CS module 32 (or modules) for both circuit switched (CS) and packet switched (PS) call handling functions, in contrast to the multiple IWF modules (i.e., IWF-P and IWF-CS) 30, 32 required by the prior art system of FIG. 4. Such IWF modules 32 are commercially available from a number of sources such as U.S. Robotics Corporation, and it can be appreciated that a broad variety of IWF/MSC designs and constructions may be employed within the context of the present invention with equal success. The unified IWF module(s) 32 of the present invention accomplishes both circuit and packet switched call identification by way of header or network address information provided by the mobile units 10, 12, as discussed in greater detail below. Various processing elements are used within the IWF to perform these functions. Note that in the present embodiment, these processing elements take the form of one or more software (or firmware) modules or layers; however, it can be appreciated that other combinations of hardware, firmware, and software may be used to provide the processing functionality described.

Data interchange between the IWF 32 and the BSC/MSC complex 34 is typically accomplished through the use of a standard data interface 104 (such as an "L" interface as described in IS-658, "Data Services Interworking Function Interface Standard for Wideband Spread Spectrum Digital Cellular System"), which are well known in the art. By using only one IWF 32 for both functions, infrastructure hardware, software, and maintenance requirements are reduced as compared to the prior art dual-IWF architecture of FIG. 4.

Figure 7:
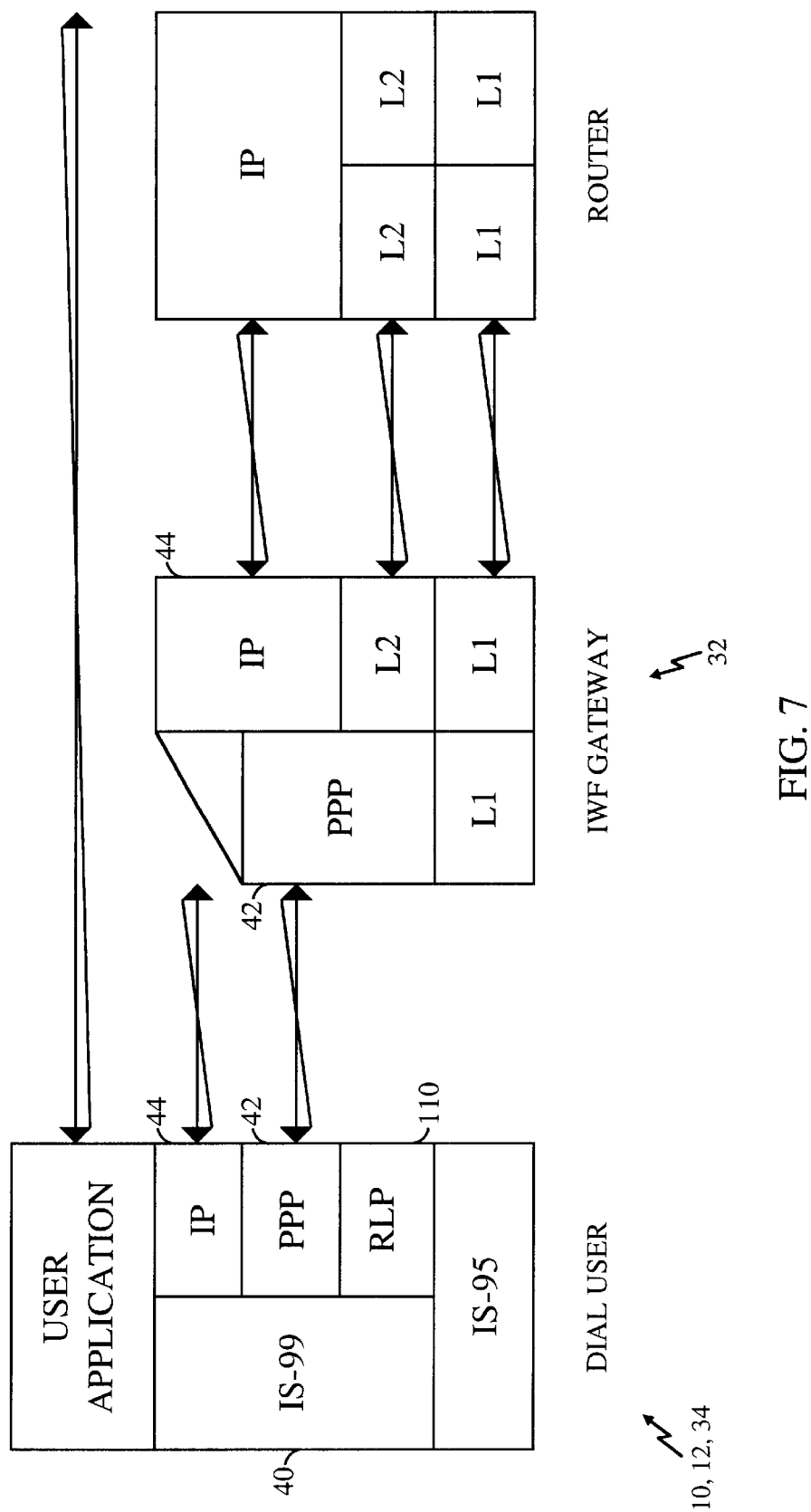
FIG. 7 is a block diagram showing a first preferred embodiment of the FCS packet data protocol stack architecture of the present invention.

FIG. 7 shows a first embodiment of the fast circuit switched data protocol stack architecture of the present invention, used in conjunction with the IWF architecture of FIG. 6. TCP/IP transport and internetwork protocols are selected for use in this embodiment due to their current widespread implementation in network systems, although it can be appreciated that a variety of different network and/or transport layer protocols may be utilized with equal success. In the case of a mobile-originated packet data call, payload call data received from the MSC/BSC radio link protocol (RLP) layer is routed directly to the PPP (or comparable protocol) link layer 42 of the IWF 32. In this embodiment, IS-99 is not used by the unified IWF 32 to process the packet data. In the case of a normal mobile-originated circuit switched call, the IWF 32 functions as a normal IWF-CS, and the circuit switched call data is routed to the IS-99 stack 40 within the IWF 32 for further processing. Note that the handling of mobile-terminated calls will be discussed in greater detail below.

The distinction between packet and circuit switched mobile-originated calls in this first embodiment is made by the IWF by examining identification information (for example, the destination IP address or TCP port (e.g., socket) of the first call data segment received by the PPP layer 42 of the IWF 32 from the BSC/MSC 34. Specifically, if the identification information does not match a prescribed value for the selected service option, the IWF 32 will treat that call in a different manner, such as routing the payload data directly to the IP layer as described above. As an example, the IS-99 standard requires all mobile-originated calls on cellular Service Option "4" (SO4) to connect to a modem server on destination TCP port of "380" during call origination procedures. If the mobile originates a call with a destination IP address other than the IWF or a TCP port other than "380", the IWF 32 will not treat the call as an IS-99 SO4 call, but rather as a packet data SO4 call, and therefore route the subsequent payload data bytes to the IP layer 44 of the protocol stack for further processing. Subsequently, the IP address embedded in the payload data provides the necessary routing data for the IP layer to direct the data to the internet and its ultimate destination via any number of standard network data interfaces present in the IWF.

Figure 8:
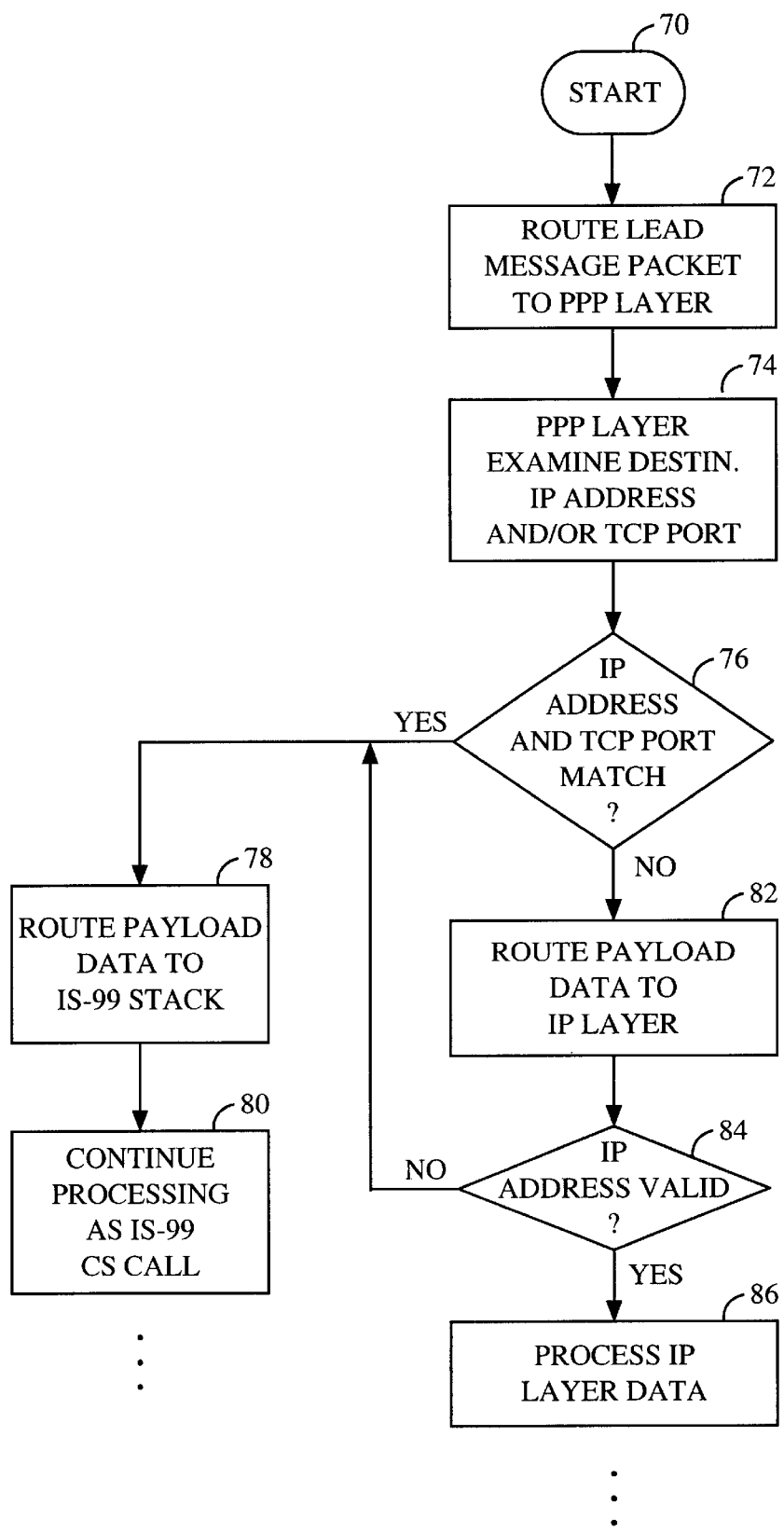
FIG. 8 is a flowchart showing the general operation of the FCS protocol stack architecture of FIG. 7.

FIG. 8 depicts the logical flow of this process. In the start state 70, packet message data has been received by the IWF 32. The lead message packet is then routed to the PPP layer of the IWF in Step 72, where the destination socket is read (Step 74) and compared to a predetermined stored value in Step 76. If the received and stored socket values match, payload bytes within the message packet(s) are routed to the higher layers of the IS-99 stack per Step 78, and processing continues as a normal IS-99 circuit switched call in Step 80 and subsequent. In the case of an FCS packet call, however, the IP address will not match by design, and the remaining data is routed to the IP layer of the IWF per Step 82 for further analysis. Embedded with this data is the destination IP address, which is checked for proper format in Step 84. If valid, the message data is then routed to the packet data network as per Step 86 and subsequent.

It should be noted that since existing IWF configurations are programmed to examine the first data segment of any call being brought up on SO4 for the proper socket, little modification to the existing IWF software is required to implement this aspect of the present invention. Furthermore, by not having to process the IS-99 layer for FCS data calls, call connection time is dramatically reduced. Preliminary testing of the present invention indicates a significant reduction of the time from FCS call initiation to actual data transfer over the prior art "IS-99 stack" method previously described.

In the case of a mobile-terminated call, the concept of mobile unit dormancy should also be considered. In the packet data context, dormancy generally relates to the condition wherein the mobile unit is not connected to a traffic channel with a packet data service option connected. Dormancy is utilized to conserve mobile unit processing and power resources, commodities of great significance to the mobile unit designer and user. Furthermore, dormancy conserves a carrier's over-the-air capacity. Although not a requirement, methods and architectures for handling mobile-terminated FCS data calls should provide for dormant mode operation.

As set forth in IS-707.5, the IWF and the mobile unit in an IS-95 wireless system utilize a link layer protocol (PPP or other) to transmit and receive packet data between them. The IWF link layer connection is opened when a packet data service option is first connected. Two substates or modes within the opened IWF link layer are possible: active and dormant. "Active" mode exists when the mobile unit is on a traffic channel with a packet data service option connected. "Dormant" mode exists when the mobile unit is not on such a traffic channel. Additionally, under IS-707.5, two further sub-substates exist for the dormant mode: dormant/idle and dormant/traffic. In the "dormant/idle" state, the mobile unit is not on a traffic channel, and packet data can not be transferred. In the "dormant/traffic" state, the mobile and BSC/MSC are in communication via a traffic channel, but with no packet data service option connected. When the IWF link layer is dormant (idle or traffic) and the MSC/BSC has packet data to send to the mobile, the BSC/MSC enters the so-called paging state, whereby 1) the IWF requests the BSC/MSC to connect a packet data service option to the mobile station ("connected" state) and traffic channel as required to permit delivery thereto of packet data, and 2) the BSC/MSC pages the mobile unit. If the link layer is open, the requested traffic channel is opened and service option connected to permit data transfer. In this fashion, a traffic channel/service option are only used when necessary to transfer packet data, thereby conserving mobile unit and air interface resources. Note that the link layer (PPP) is maintained open regardless of the dormancy of the link unless the service option has changed since the link layer entered the dormant state.

However, to the degree that the above-described packet data dormancy features of IS-707 are not supported in existing infrastructure and mobile units, another method must be utilized to effectuate establishment of a traffic channel and associated service option over which the FCS data may be transmitted. A complicating factor relates to the service option used to page the mobile unit. Specifically, if the mobile is paged using the existing circuit switched asynchronous data service option (SO4), the mobile unit will not be able to differentiate between a true asynchronous data call and an FCS data call to determine whether it should auto-answer the call or not. It would be undesirable to have the mobile unit auto-answer a true asynchronous call when the mobile unit is attempting to receive FCS data; similarly, it would also be undesirable for the mobile unit to auto-answer an FCS call when attempting an asynchronous call.

One proposed solution in lieu of IS-657/707 implementation involves the use of a short message service (SMS) message sent from the internet (packet data) server to an SMS center to page the mobile unit separately from standard paging over SO4. Once the mobile unit receives the SMS message, it then brings up the FCS data call on SO4 to permit packet data transfer. This approach bypasses the aforementioned ambiguity relating to asynchronous data calls, however, it has several drawbacks including 1) requiring the use of an external SMS system, with its associated hardware and software, 2) requiring the packet data originating source (such as the Unwired Plant Server) to have sufficient intelligence to use the SMS system for mobile-terminated packet data calls, and 3) requiring modification of the mobile unit logic to recognize the packet data SMS message and initiate the proper response (i.e., opening a traffic channel/service option) upon receipt.

Based on the foregoing, a better solution for mobile terminated FCS data calls is required. The present invention provides such a solution by using a separate existing cellular service option (such as SO5 presently allocated for digital facsimile data, although it can be appreciated that other existing service options may be used with equal success) to page the mobile unit in the event of an FCS data call. Specifically, datagram header information received by the IWF from the internet server or other similar source is used as previously described to identify the call as an FCS data call to the IWF. The IWF then instructs the BSC/MSC to page the dormant mobile unit using SO5 (or other comparable service option), which results in the mobile connecting the appropriate traffic channel and service option. Based on service option, the mobile unit can therefore distinguish between an asynchronous data call (SO4 in the present example) and an FCS data call (SO5). In the case of a digital facsimile call, the IWF instructs the BSC/MSC to page the mobile unit over SO4 (or comparable service option other than SO5), since the IWF can not readily distinguish between a PSTN-originated asynchronous data call and a digital facsimile call. Accordingly, there is little or no likelihood that a facsimile call would be paged to the mobile unit via SO5 under any circumstance; hence any possible ambiguity relating to the identification of pages received over SO5 is eliminated.

Figure 9:
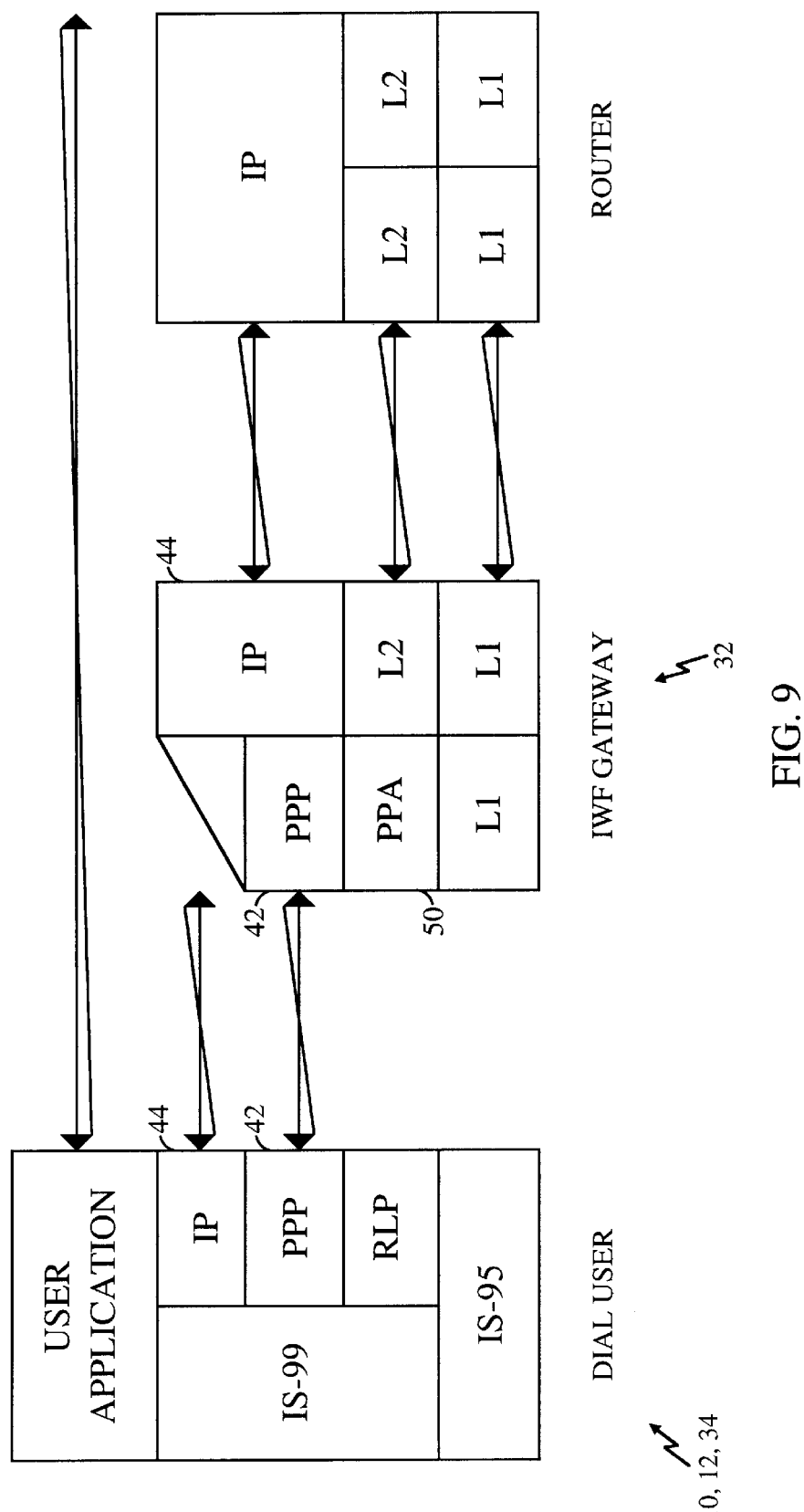
FIG. 9 is a functional block diagram showing another embodiment of the FCS packet data protocol stack architecture of the present invention.

A second embodiment of the fast circuit switched (FCS) protocol stack architecture of the present invention is depicted in FIG. 9. In this second embodiment, the mobile-originated FCS data call is identified by the IWF 32 through the use of two or more flag frames in the datagram headers transmitted by the mobile unit. For example, a sequence of five flag frames in the first data packet received could be used for this purpose [note that existing systems currently use only one or two flag frames at the beginning of a true circuit switched call]. To detect the aforementioned flag frames, a preprocessing algorithm (PPA) or module 50 is placed in the IWF's protocol stack above the L1 layer as shown in FIG. 9, although other locations and mechanisms for processing the received signal to identify the flag frames may be used with equal success. The preprocessing module 50 may be seamlessly integrated into the protocol stack, and provides no significant processing burden on the IWF 32. The structure and function of such processing algorithms are well understood in the art. If the preprocessor 50 encounters the required number of flag frames when processing the message preamble, the subsequent data bytes are treated as an FCS packet data call on SO4 (or other selected option) and delivered to the IP layer 44 of the IWF stack for further routing to the internet. If the requisite flag frames are not encountered by the PPP layer 42 of the IWF stack, the call is treated as a normal circuit switched call and subsequently processed using the remainder of the IS-99 stack.

Figure 10:
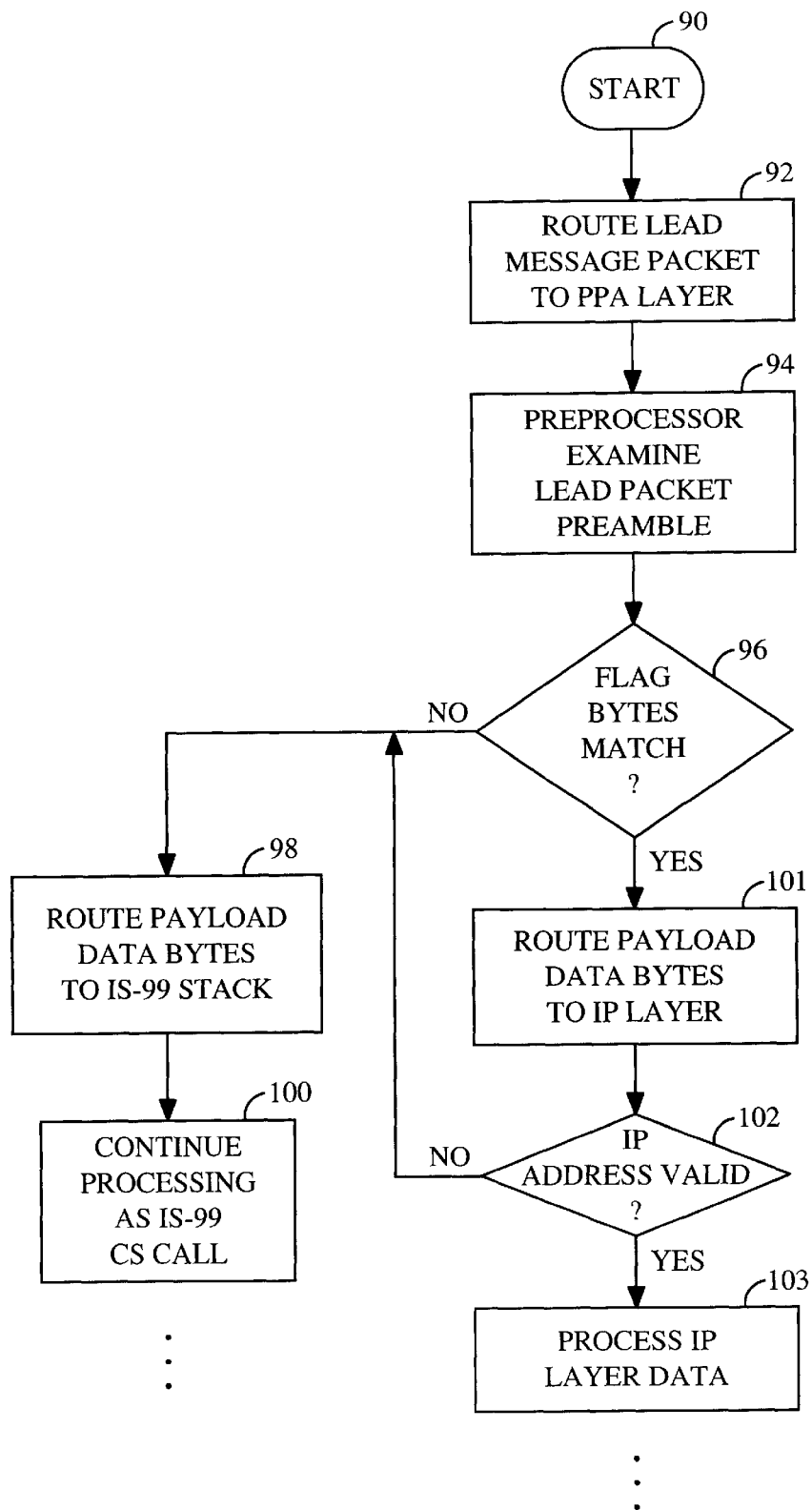
FIG. 10 is a flowchart showing the general operation of the FCS protocol stack architecture of FIG. 9.

FIG. 10 shows the logical flow process associated with this second embodiment. Lead packet message data is received by the IWF in the start state 90, and routed to the preprocessing layer (PPA) in Step 92. In Steps 94 and 96, the PPA examines the message packet preamble for a predetermined sequence of flag bytes. If the flag byte sequence is not found, payload data is routed to the IS-99 stack per Step 98. If found, the message data is routed to the IP layer and processed (per Steps, 101, 102, and 103) in fashion similar to that previously discussed with respect to FIG. 8.

One potential risk in employing the "flag" method of the second embodiment described above is that a "foreign" mobile unit not equipped for FCS data capability could conceivably transmit the requisite sequence of flags as part of a circuit switched call, thereby erroneously routing the call to the IP layer. However, the sequence and placement of such flags within the transmitted message can both easily be selected so as to make the likelihood of such erroneous recognition negligible.

While the above detailed description has shown, described, and pointed out fundamental novel features of the invention as applied to various embodiments, it will be understood that various omissions, substitutions, and changes in the form and details of the device or process illustrated may be made by those skilled in the art without departing from the spirit of the invention. It will further be appreciated that while described primarily in terms of software, the present invention may be embodied in various combinations of hardware, software, or firmware depending on the needs of each individual application.

I claim:

1. A method of transferring packet data over a circuit switched network, said method comprising:
   providing packet data having identification information related thereto;
   directing said packet data to a circuit switched network entity, wherein circuit switched data is processed;
   analyzing said identification information at said network entity; and
   processing said packet data in a manner different than that used for circuit switched data.

2. The method of claim 1, wherein said identification information is a network layer address.

3. The method of claim 2, wherein said identification information is an internet protocol (IP) address.

4. The method of claim 1, wherein said identification information is a transport layer port address.

5. The method of claim 4, wherein said identification information is a transport control protocol (TCP) port address.

6. The method of claim 1, wherein said identification information is a plurality of flag bytes.

7. The method of claim 1, wherein said circuit switched network entity is a BSC/MSC with associated interworking function.

8. The method of claim 1, wherein said manner of processing said packet data includes routing packet data bytes to a network access layer of a protocol stack.

9. A method of transferring packet data over a communication network, said method comprising:
   providing packet data having identification information related thereto;
   transmitting said packet data as circuit switched data from a first network entity;
   receiving said packet data at a second network entity;
   analyzing said identification information to identify packet data that is associated with said circuit switched data; and
   processing said identified packet data within said second entity as circuit switched data.

10. The method of claim 9, wherein said identification information is a network layer address.

11. The method of claim 10, wherein said identification information is an internet protocol (IP) address.

12. The method of claim 9, wherein said identification information is a transport layer port address.

13. The method of claim 12, wherein said identification information is a transport control protocol (TCP) port address.

14. The method of claim 9, wherein said identification information is a plurality of flag bytes.

15. The method of claim 9, wherein said first network entity is a mobile unit.

16. The method of claim 15, wherein said first network entity is a cellular mobile unit complying with TIA/EIA Interim Standard IS-95.

17. The method of claim 9, wherein said second network entity is a BSC/MSC complex with associated interworking function.

18. The method of claim 9, wherein said transmission of said packet data as circuit switched data occurs over an existing cellular service option.

19. The method of claim 9, wherein said processing of said identified packet data includes routing one or more packet data bytes to a network access layer of a protocol stack.

20. A method of transferring packet data over a circuit switched communication network, said method comprising:

provide packet data having identification information related thereto;

transmitting said packet data as circuit switched data from a first circuit switched network entity;

receiving said packet data at a second circuit switched network entity wherein circuit switched data is processed;

analyzing said identification information to identify packet data associated with said circuit switched data;

processing said packet data in a manner different than that used for said circuit switched data.

21. A method of transferring packet data over a circuit switched cellular communication network, said method comprising:

providing packet data having identification information related thereto;

transmitting said packet data from a cellular mobile unit as circuit switched data;

receiving said circuit switched data at a circuit switched cellular base station;

transferring received circuit switched data from said base station to an interworking function;

analyzing said identification information associated with said circuit switched data to identify said packet data therein; and processing said packet data and routing one or more bytes thereof to an external data network.

22. The method of claim 21, wherein said identification information is a network layer address.

23. The method of claim 22, wherein said identification information is an internet protocol (IP) address.

24. The method of claim 21, wherein said identification information is a transport layer port address.

25. The method of claim 23, wherein said identification information is a transport control protocol (TCP) port address.

26. The method of claim 21, wherein said identification information is a plurality of flag bytes.

27. The method of claim 21, wherein said external data network is the Internet.

28. The method of claim 21, wherein said circuit switched data is transferred indirectly from said base station to said interworking function.

29. A circuit switched communication entity which processes both circuit switched and packet data, said entity comprising:

a receiver for receiving circuit switched transmissions having identification information from another network entity, at least one of said received circuit switched transmissions having packet data embedded therein;

a first processing element for analyzing said circuit switched transmissions received by said receiver and identifying said transmissions having packet data embedded therein through analysis of said identification information;

a second processing element for further processing of said circuit switched transmissions having no embedded packet data; and a third processing element for further processing of said circuit switched transmissions having packet data embedded therein, said third processing element being functionally connected to an external data network.

30. The communication entity of claim 29, wherein said identification information is a network layer address.

31. The communication entity of claim 30, wherein said identification information is an internet protocol (IP) address.

32. The communication entity of claim 29, wherein said identification information is a transport layer port address.

33. The communication entity of claim 32, wherein said identification information is a transport control protocol (TCP) port address.

34. The communication entity of claim 29, wherein said identification information is a plurality of flag bytes.

35. The communication entity of claim 29, wherein said entity is an interworking function (IWF).

36. The communication entity of claim 29, wherein said first, second, and third processing elements are computer software code modules running on at one least digital signal processor.

37. The communication entity of claim 29, wherein said first, second, or third processing element utilizes a Point-to-Point Protocol (PPP) serial link software protocol.

38. A method of transmitting packet data to a dormant network entity, said method comprising:

directing packet data having identification information to a first network entity;

paging a dormant network entity using a first circuit switched logical channel;

establishing a second circuit switched logical channel between said first network entity and said dormant entity in response to said paging;

transmitting said packet data from said first entity to said dormant entity over said second logical channel; and identifying said packet data received by said dormant entity through analysis of said identification information.

39. The method of claim 28, wherein said identification information is a facsimile service option.

40. The method of claim 28, wherein said identification information is a network layer address.

41. The method of claim 40, wherein said identification information is an internet protocol (IP) address.

42. The method of claim 38, wherein said identification information is a transport layer port address.

43. The method of claim 42, wherein said identification information is a transport control protocol (TCP) port address.

44. The method of claim 38, wherein said identification information is a plurality of flag bytes.

45. The method of claim 38, wherein said first network entity is a BSC/MSC complex with associated interworking function.

46. The method of claim 38, wherein said first and second logical channels are established in accordance with existing cellular service options.

47. The method of claim 38, wherein said dormant network entity is a cellular mobile telephone.

* * * * *